Dec. 9, 1969  A. B. MACE  3,482,542
ILLUMINATED POSITION INDICATING DEVICE
Filed Nov. 17, 1967

INVENTOR.
Arthur B. Mace
BY
Hugh L. Fisher
ATTORNEY

United States Patent Office 3,482,542
Patented Dec. 9, 1969

3,482,542
ILLUMINATED POSITION INDICATING DEVICE
Arthur B. Mace, Warren, Mich., assignor to General Motors Corporation, Detroit, Mich., a corporation of Delaware
Filed Nov. 17, 1967, Ser. No. 683,840
Int. Cl. G09f 9/40
U.S. Cl. 116—124       2 Claims

ABSTRACT OF THE DISCLOSURE

An illuminated position indicating device having a control member which is supported in a housing for selective movement between a number of positions. The control member includes a plurality of light transmitting sections which are separately illuminated by an equal plurality of light beams. The light beams are formed by light passing through a corresponding number of apertures in the housing. A series of colored light conducting elements is mounted on the control member such that varying combinations of the individual light conducting elements are permeated by the light beams as the control member is moved from one position to another, whereby for each selected position of the control member the light transmitting sections are variously illuminated in color corresponding to the colors of the individual light conducting elements being permeated by the light beams.

---

This invention relates to an illuminated position indicating device and more particularly to a control member having an illuminated area for indicating the relative position of the control member.

The subject invention is adaptable to a variety of control members including knobs, dials, sliders, push-buttons and rockers. These control members are used on many different kinds of machinery, ranging from road vehicles to domestic appliances. One very useful application of the subject invention is in a rocker type electrical switch.

Rocker switches are well known and widely employed in the art. They are simple and compact, stylish and fashionable, rugged and reliable, and they may be economically manufactured and assembled. These desirable characteristics make rocker switches well suited for an assortment of uses in modern automobiles. In the past they have been employed in automobiles to control the operation of power windows. However, another particularly advantageous application of a rocker switch in an automobile is to control the operation of the vehicle headlamps.

In an automobile, it is common to provide two sets of headlamps for night driving, one having high beams designed to illuminate the surrounding area far ahead of the automobile and the other having low beams designed to illuminate only the area immediately ahead of the automobile. The high beam lamps are used to achieve maximum visibility, while the low beam lamps are used to avoid directing light into the eyes of operators of oncoming vehicles. However, the use of low beams seriously reduces the visibility of the principal automobile operator. Therefore, in veiw of the recent vast increase in the number of divided highways, it is desirable to provide a third set of headlamps having intermediate or expressway beams, which are designed to illuminate the area far ahead of the automobile to afford maximum visibility while narrowly focusing the illuminated area to avoid directing light into the eyes of operators of oncoming vehicles.

With three possible headlamp modes, it is vitally necessary, in order to insure maximum visibility and to avoid blinding the vision of other vehicle drivers, that the automobile operator be apprised at all times of the headlamp mode in present use and be able to quickly switch from one headlamp mode to another as traffic conditions and road characteristics warrant. A rocker switch incorporating the subject invention alleviates these problems by offering the automobile operator a continuous illuminated indication of the present headlamp mode in eye-catching color, which periodically commands his attention, while providing a means for effectively switching from one headlamp mode to another.

Therefore, it is the principal object of this invention to provide an illuminated position indicating control member. It is a further object of this invention to provide a position indicating control member wherein separate portions of the control member are variously illuminated in color for each selected position of the control member.

To accomplish these objects, the invention comprises a control member supported for selective movement between a number of positions. The control member includes a plurality of light transmitting sections which are separately illuminated by light passing through a series of colored light conducting elements. The light conducting elements are mounted such that varying combinations of the individual light conducting elements are permeated by the light as the control member is moved from one position to another, thereby illuminating the light transmitting sections of the control member in varying colors corresponding to the colors of the individual light conducting elements being permeated by the light at each particular position of the control member. It is to be understood as used herein that color is intended to include that quality of light seen as white.

In the preferred embodiment of the invention, the light conducting elements are of such color and so arranged that for each selected position of the control member a different one of the light transmitting sections is illuminated in one specific color while the other light transmitting sections are illuminated in another single color.

The invention may be best understood by reference to the following detailed description of the preferred embodiment when considered in conjunction with the accompanying drawing, in which.

The preferred embodiment of the invention is a three position rocker switch for controlling the headlamps of an automobile. However, the invention is in no way limited to such an application and it is equally adaptable to many other types of control members as hereinbefore indicated.

Figure 2:
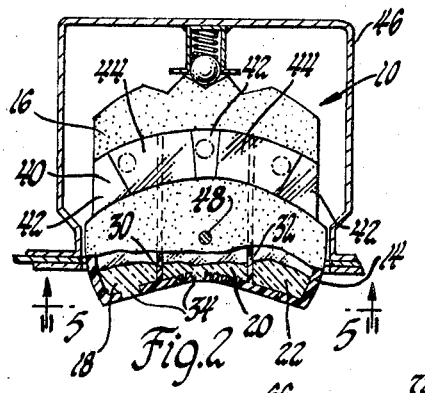
FIGURE 2 is a partial cross-sectional view along the line 2—2 of FIGURE 1.
Figure 4:
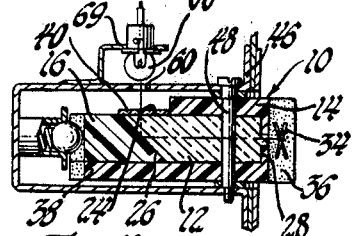
FIGURE 4 is a cross-sectional view along the line 4—4 of FIGURE 1.
Figure 5:
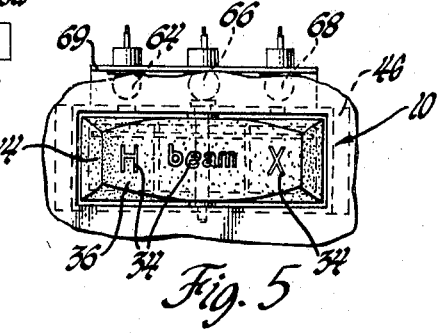
FIGURE 5 is a cross-sectional view along the line 5—5 of FIGURE 2.
Figure 6:
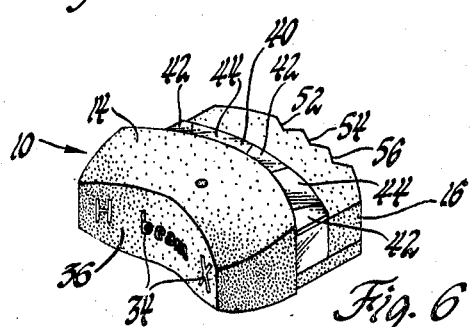
FIGURE 6 is a perspective view of the rocker body.

With reference to FIGURES 2 and 4, the illustrated switch includes a rocker body 10 comprised of a translucent central member 12, an opaque cover member 14 and an opaque bottom member 16. The central member is divided into three sections 18, 20 and 22, each having an entrance face 24, a reflecting surface 26, and an indicating face 28. The translucent sections are separated by spacers 30 and 32, which may be formed integral with the cover member 14. Appropriate indicia 34 project from the indicating face 28 of each section. In a three position headlamp switch the designated indicia may be "H" for the high beam mode, "beam" for the low beam mode, and "X" for the expressway beam mode, as shown in FIGURE 5.

Cover member 14 is assembled over central member 12 and overlays all surfaces except entrance faces 24 and reflecting surfaces 26. The raised indicia 34 are adapted to fit into corresponding cutouts in the upper surface 36 of cover member 14 so as to be flush with the upper surface. Bottom member 16 is assembled over reflecting surfaces 26 against the lower portion 38 of cover member 14.

Together, entrance faces 24 define a narrow arcuate strip 40. A series of colored light conducting elements 42 and 44 covers the entrance faces 24 along the entire length of strip 40. The light conducting elements may be of any desired color, as for example blue 42 and white 44.

Figure 3:
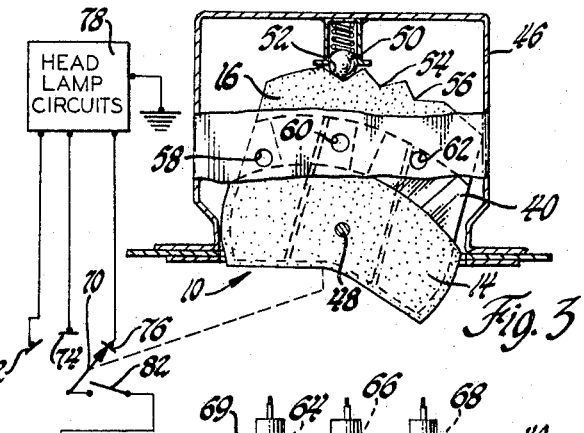
FIGURE 3 is a partial cross-sectional view through the mounting bracket and including a full elevation of the rocker body together with a schematic diagram of the associated electrical circuitry.

As illustrated in FIGURES 3 and 4, the rocker body 10 is mounted in a housing 46 by means of a pin 48 for pivotal movement between first, second, and third positions established by the engagement of a spring biased ball detent 50 with notches 52, 54 and 56, respectively, in the lower surface of bottom member 16. The housing contains three apertures 58, 60 and 62 arranged in an arcuate pattern, one aperture aligned opposite each translucent section. Three lamps 64, 66 and 68 are mounted on the housing 46 by means of a bracket 69, one lamp adjacent each aperture as shown in FIGURES 3 and 5.

Figure 1:
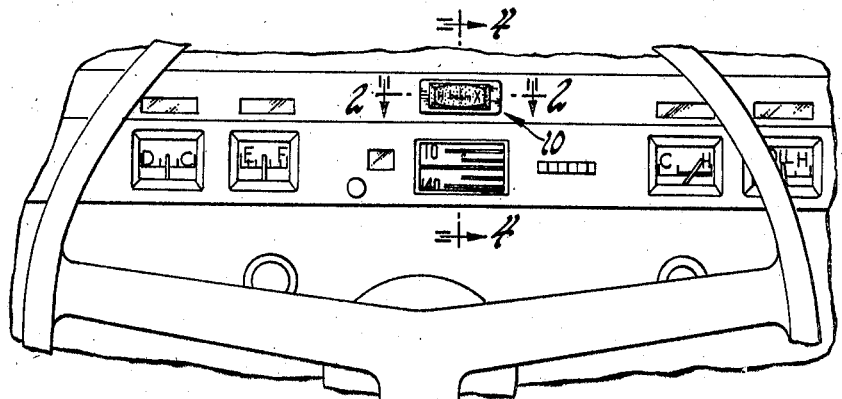
FIGURE 1 is a plan view of a three position headlamp switch, embodying the invention, mounted on the instrument panel of an automobile.

The housing is adapted to be mounted on the instrument panel of an automobile such that the indicia of the rocker body confront the vehicle operator, as illustrated in FIGURE 1. The visible portion of the rocker body protruding above the housing, has a generally V-shaped profile as is common in many rocker switches.

In the preferred embodiment, translucent sections 18, 20 and 22 are made of clear Plexiglas while opaque members 14, 16, 30 and 32 are made of black Plexiglas. The light transmitting properties of the translucent sections are enhanced by applying a reflective coating, as by vacuum metallizing or painting, on all surfaces except over entrance faces 24 and indicia 34. The visible surfaces of indicia 34 are coated with white translucent paint to sharpen their contrast with the upper surface 36 of cover member 14. Light conducting elements 42 and 44 are made of a relatively transparent material such as glass, which is appropriately colored.

In operation, light emanating from lamps 64, 66 and 68 passes through apertures 58, 60 and 62 forming three distinct light beams. These light beams are directed through colored light conducting elements 42 and 44 and through entrances faces 24 to reflecting surfaces 26 where they are reflected to the indicia 34 in indicating faces 28. Each light beam is associated with a different one of the translucent sections 18, 20 and 22. The apertures 58, 60 and 62 and the colored light conducting elements 42 and 44 are so arranged in arcuate configuration that for every position of the rocker body, each light beam always permeates one of the light conducting elements and each light beam always illuminates the same associated translucent section. The indicium of each translucent section is illuminated in a color corresponding to the color of the individual light conducting element being permeated by the light beam associated with that particular section. As the rocker body is pivoted from one position to another, the exact combination of light conducting elements permeated by the respective light beams is varied, thereby varying the colors of the illuminated translucent sections.

In the preferred embodiment, each translucent section represents a different position of the switch. The light conducting elements are of such color and so arranged, that the translucent section representing the selected switch position is illuminated in one particular color, such as blue, while the other translucent sections are illuminated in another single color, such as white.

With reference to FIGURE 3, ball detent 50 is in engagement with notch 52 and the rocker is in the first or high beam position. The light beam formed by light passing through aperture 58 permeates a blue light conducting element 42 and the indicium H is illuminated in blue, indicating that the switch is in the high beam position. The light beams formed by light passing through apertures 60 and 62 permeate a white light conducting element 44 and the indicia "beam" and X are illuminated in white. In FIGURE 2, the rocker body is in the second or low beam position. By a similar analysis it can be shown that the indicium "beam" is illuminated in blue while the indicia H and X are illuminated in white. It can be appreciated that several other illuminated configurations may be obtained by properly choosing the color, shape, and relative position of the light conducting elements.

The rocker body may be adapted to operate any one of a number of electrical contact arrangements well known in the art. One such arrangement is schematically illustrated in FIGURE 3. A movable wiper arm 70 is mounted so as to be capable of selectively engaging fixed contacts 72, 74 and 76, which are electrically connected to the respective headlamp circuits 78. The wiper arm 70 is electrically connected to a power supply 80 through a power switch 82 and mechanically connected to the rocker body 10. Providing the power switch 82 is closed, movement of the rocker body from one position to another causes wiper arm 70 to sweep across fixed contacts 72, 74 and 76, from one to another, thereby controlling the energization of the headlamp circuits 78.

It is to be understood that the specific embodiment of the invention shown and deescribed herein is merely illustrative and that various modifications and variations thereof may be made without departing from the spirit and scope of the invention.

I claim:
1. An illuminated position indicating device, comprising: a housing having a plurality of apertures therein; a light source including at least one lamp for emitting light; support means for mounting the light source outside the housing so that the light emitted by the lamp penetrates the apertures of the housing to form a plurality of light beams extending inside the housing; a control member having a plurality of light transmitting sections each including a receiving face and an indicating face, whereby a light beam passing through the receiving face is directed so as to illuminate the indicating face; mounting means for supporting the control member inside the housing for movement between a number of discrete positions so that each of the light beams passes through a different portion of the receiving face of a different associated one of the light transmitting sections when the control member is located in each discrete position; and a plurality of colored light conducting elements each covering a different portion of the receiving face of one of the light transmitting sections so that each of the light beams permeates a different one of the colored light conducting elements when the control member is located in each discrete position, thereby to illuminate the indicating face of each of the light transmitting sections in a color corresponding to the color of the light conducting element permeated by the light beam associated with the light transmitting section.

2. An illuminated position indicating rocker switch, comprising: a housing including a wall portion having a plurality of apertures therein; a plurality of lamps for emitting light; support means for mounting the lamps outside the wall portion of the housing so as to align each of the lamps opposite a different associated one of the apertures so that the light emitted by each of the lamps penetrates the associated one of the apertures thereby to form a plurality of light beams extending inside the wall portion of the housing; a rocker body having a plurality of light transmitting sections each including a receiving face, a reflecting surface and an indicating face, whereby a light beam passing through the receiving face is directed by the reflecting face to illuminate the indicating face; mounting means for supporting the rocker body inside the wall portion of the housing for pivotal movement between a number of discrete positions so as to align the receiving face of each of the light transmitting sections opposite a different associated one of the apertures so that each of the light beams passes through a different portion of the receiving face of a different associated one of the light transmitting sections when the rocker body is located in each discrete position; electrical contact means connected to the rocker body and operable between a number of discrete positions corresponding to the discrete positions of the rocker body; and a plurality of colored light conducting elements each covering a different portion of the receiving face of one of the light transmitting sections so that each of the light beams passes through a different one of the colored light conducting elements when the rocker body is located in each discrete position, thereby to illuminate the indicating face of each of the light transmitting sections in a color corresponding to the color of the light conducting element permeated by the light beam associated with the light transmitting section.

References Cited

UNITED STATES PATENTS

| | | | |
|---|---|---|---|
| 2,338,748 | 1/1944 | Watkiss | 340—380 |
| 2,668,895 | 2/1954 | Allenby | 200—167 |
| 3,139,616 | 6/1964 | Parsons | 340—378 |
| 3,225,156 | 12/1965 | Sahrbacker | 200—153.10 |
| 3,267,248 | 8/1966 | Bagley. | |
| 3,368,216 | 2/1968 | Rose | 340—381 XR |

OTHER REFERENCES

Electronic Equipment Engineering, March 1962, p. 39, "Color Illuminated Levers."

LOUIS J. CAPOZI, Primary Examiner

U.S. Cl. X.R.

200—167